Figure 3:
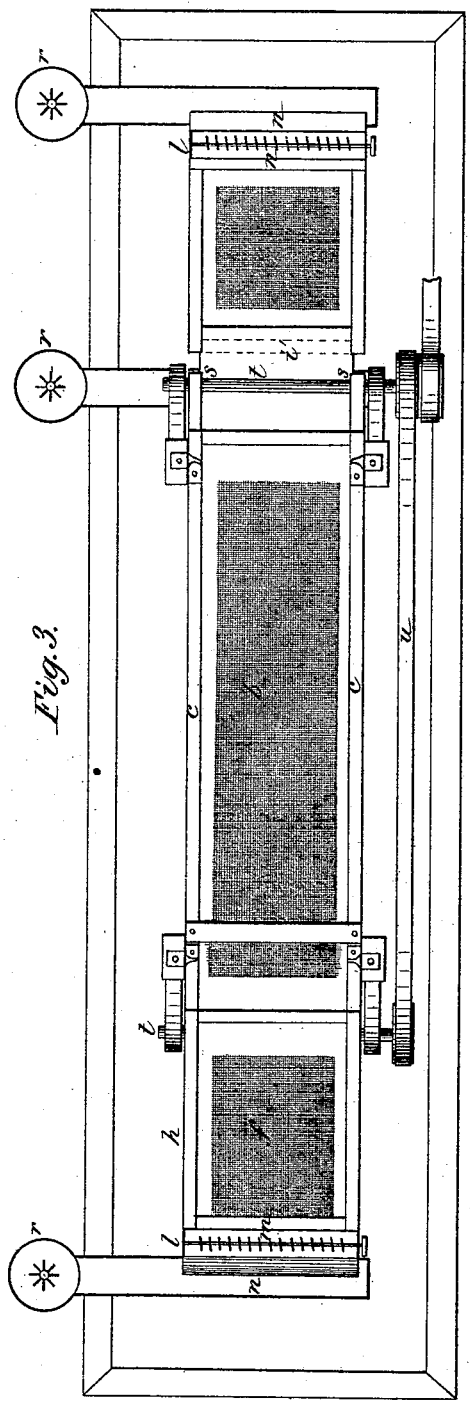

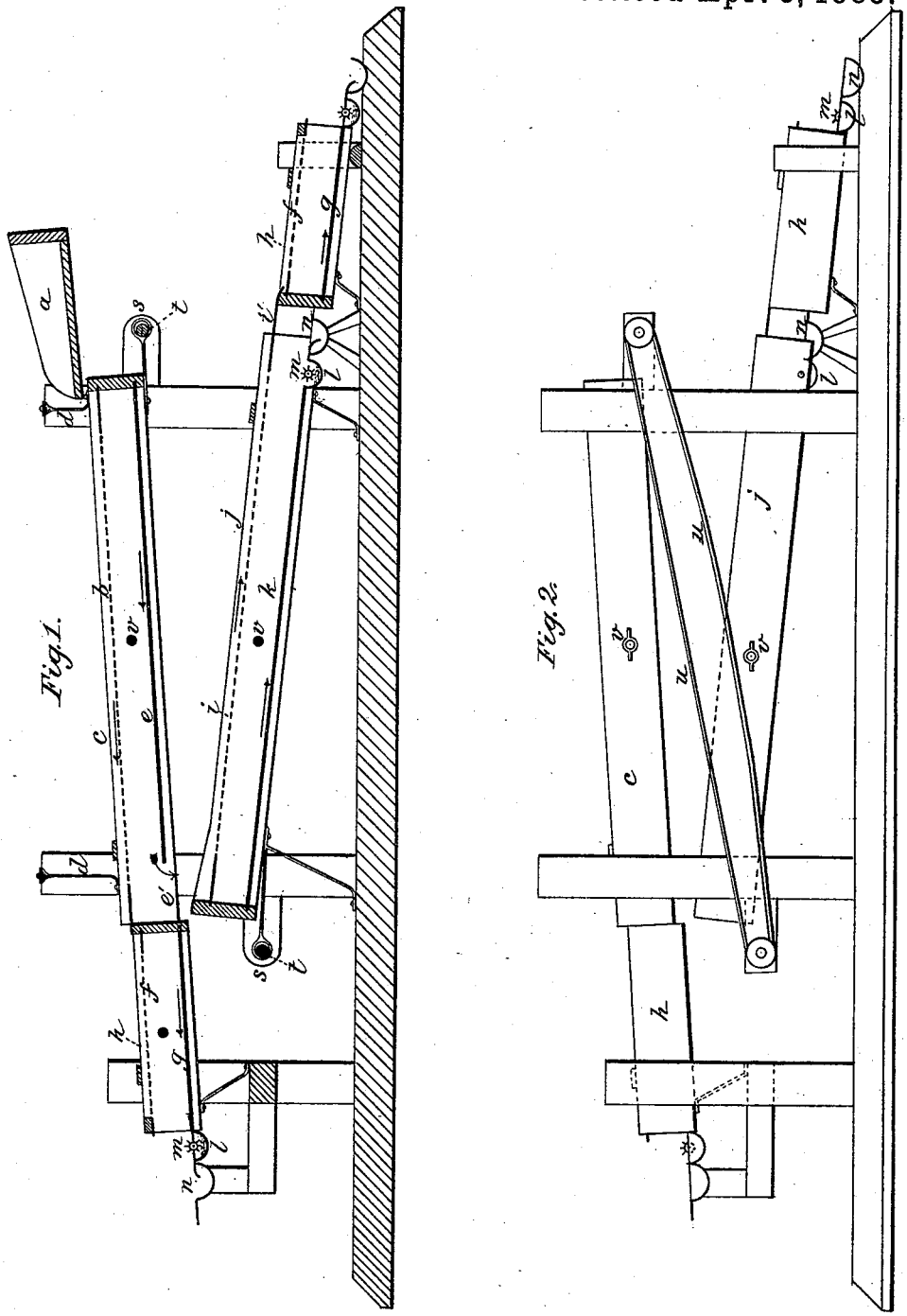

(No Model.)

C. D. BIGELOW.
APPARATUS FOR SIZING AND AMALGAMATING PRECIOUS METALS.

No. 275,325. Patented Apr. 3, 1883.

Witnesses:

Inventor:
Charles D. Bigelow
pro Johnson and Johnson
Attys

UNITED STATES PATENT OFFICE.

CHARLES D. BIGELOW, OF BROOKLYN, NEW YORK.

APPARATUS FOR SIZING AND AMALGAMATING PRECIOUS METALS.

SPECIFICATION forming part of Letters Patent No. 275,325, dated April 3, 1883.

Application filed February 24, 1882. (No model.)

*To all whom it may concern:*

Be it known that I, CHARLES DANA BIGELOW, a citizen of the United States, residing at Brooklyn, county of Kings, and State of New York, have invented new and useful Improvements in Apparatus for Sizing and Amalgamating Precious Metals, of which the following is a specification.

In placer-mining there are large bodies of surface earth and gravel containing gold in a fine or float condition, and in the treatment of this fine or "pay" dirt or reduced ore it is the object of my improvement to size and divide the particles, so as to bring them into direct contact with vibrating amalgamating-plates in a thin dropping and flowing sheet, making such contact, as nearly as possible, single for each particle under the action of the flow and of the vibrating motion of the amalgamated surface.

In my improved amalgamator the separation of the particles of gold or silver from the pulp is effected by screens of different meshes, each being combined in separate sluice-boxes with an amalgamated plate, each sluice-box being vibrated independently, and arranged in oppositely-inclined relation to each other at different degrees of inclination, so that the dropping and flowing pulp will be subjected to an extended separating and amalgamating action by screens of different meshes, inclined in opposite directions, vibrated separately, and each treating a different grade of pulp and delivering it in separate grades upon separate amalgamated plates, so that the sized and divided pulp is treated continuously in different sizes of particles upon separate amalgamated plates, there being such a plate for each different size of mesh of screen.

The continuous treatment of pulp in different grades by my improved amalgamator not only increases the yield in the precious metal, but the provision of the oppositely-inclined vibratable sluice-boxes, each treating a separate grade of pulp, renders the operation rapid, which, in the treatment of such pulp, is of the highest importance economically. To obtain such distinct grades each separate sluice-box is provided with an end screen of coarser mesh, onto which the pulp not passing through the primary screen is delivered for distribution upon an amalgamated plate for that special grade or size, both constituting a part of the inclined vibratable sluice-box, whereby the pulp is treated in two separate grades to separate screenings over an amalgam plate provided for each different mesh of screen.

In the drawings I have shown the sluice-boxes as having varied inclinations, the object of which is to suit them to the different grades or sizes of pulp to compensate for the loss of water in the carrying off of the pulp from the lower sluice-boxes. It will also be seen that the sluice-boxes are supported in such manner as to cause them to have a slight vertical quick jumping motion by the action of the short quick vibratory movement, thereby producing a tremulous motion to the current as it flows over the sieves and plates, causing the float metals to sink and reach the amalgamated surface. A simple vibratory movement is found ineffectual to secure this important result. These supports are shown as elastic strips, inclined and of different lengths, so that each sluice, when vibrated, must have a short up-and-down motion upon its supports, thus producing the result stated. It will be understood that all the ore pulp received upon the top screen is treated and brought in contact with the amalgamated plate, and the screens are used solely for "sizing," and that each "size" is treated by its separate amalgamated surface, so that no waste is discharged until after it has been sized and brought in contact with the plates. I mean by "sizing" the pulp that it is separated into particles so nearly of a size that no large heavy particles of quartz shall prevent the smaller particles of metal from coming in contact with the plates, as I size the pulp close enough so that no large particles of waste shall remain with any small particles of metal.

Figure 4:
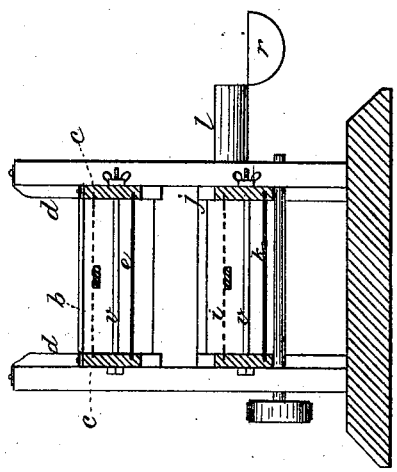

Referring to the accompanying drawings, Figure 1 represents a vertical longitudinal section of my improved apparatus for sizing and amalgamating precious metals; Fig. 2, a side elevation of the same; Fig. 3, a top view, and Fig. 4 a transverse section, of the same.

In my device for sizing and amalgamating precious metals the pulp or ore is delivered from a stirrer into a sluice, $a$, from which it is carried by a current of water upon an inclined vibrating screen, $b$, removably secured in a frame, c, suspended by hangers d d, or otherwise supported upon a fixed frame. This screen serves to size and to distribute the particles of the pulp upon an amalgamated plate, e, also removably secured in the frame c beneath the screen, and having substantially the same inclination thereof. This amalgamated plate forms the bottom of a sluice-box and a conveyer for the pulp. Its lower end terminates short of the screen, leaving a space, e', in the box, through which the pulp passes from the amalgamated surface. The flow of the water over the screen also effects a flow over the amalgamated plate in a thin sheet, and as the amalgamated plate receives the sized ore in separated particles over its entire surface, it is important to present the amalgam coating of the plate in an effective condition to the falling particles, in order that the metallic particles of the pulp shall have immediate contact with the amalgam. For this purpose the inclination of the amalgamated plate, its rapid vibratory movement, and the flow of water cooperate to keep its surface free from the accumulation of pulp. This self-cleaning function of an extended amalgamated plate causes a more complete amalgamation of the metallic particles as they drop from the screen than could be effected by a surface over and upon which the pulp collects and forms a receiving bed or body for the falling pulp, and which effectually presents the separate contact of separate particles with the amalgam. The particles of pulp too large to pass through the meshes of the screen b are delivered upon an auxiliary short coarse screen, f, through which they are distributed upon an amalgamated plate, g, which, with the screen f, forms an auxiliary amalgamating sluice-box, h, preferably connected therewith, having the same inclination of and vibrated by the primary sizing and amalgamating box. The amalgamated plate g forms the bottom of the auxiliary sluice-box, and the screen f is coarse enough to distribute the pulp which passes over the first screen. Thus the particles of pulp too large to pass through the first screen are subjected to a coarser distribution and delivered directly upon a vibrating amalgamating-surface by the flow induced by the inclination and the vibratory movements of the connected sizing and amalgamating sluice-boxes. The pulp passing from the amalgamating-plate of the first screen is delivered upon the upper end of a screen, i, secured in a frame, j, hung or mounted in the fixed frame, and having an amalgamated plate, k, beneath said screen i, forming the bottom of a sizing and amalgamating sluice-box inclining in a direction opposite to that of the upper box and having a vibratory movement. The screen i is of finer meshes than the top screen, b; but its length and inclination should be about equal to that of the top screen, so that the pulp flowing from the amalgamating-plate e upon the upper end of the screen i is distributed upon the amalgamating-plate k by the flow of the water and the gravitating force induced by the inclination and the vibrating movement of the box, thus effecting a finer sizing of the metallic particles over and upon an amalgamated surface having the capacity to free itself of the pulp and expose such surface to separate contact of the separate metallic particles falling from the screen. An auxiliary box is combined with this lower box in the same manner and of the same construction as that described in connection with the upper box, and serving the same purpose of a separate amalgamating-box for the pulp passing from the screen of the lower box, the connection between the two being made by the plate i'. In this way each screen of each box distributes pulp over a self-freeing amalgamating-surface, and each amalgamating-surface collects metallic particles of different size in its function as a conveyer for the pulp in a thin flowing sheet. The amalgamating-plate of the lower inclined vibrating box empties into a mercury-sink, l, within which a stirrer, m, is arranged to be slowly revolved. This stirrer may be formed with ribs or with arms just entering the mercury, so as to keep the pulp entering the sink well stirred, and thus collect any metallic particles by contact with the mercury which may have been kept from contact with the amalgamating-surface. From this mercury-sink the pulp is delivered over the end of the amalgamating-plate into a fixed trough, n, which leads to and empties into a settling-pan or stirrer, r, of the usual construction. Each of the auxiliary amalgamating-boxes is provided with a mercury-sink and revolving stirrer, and empties into a fixed trough discharging into a settling-pan or stirrer similar to those described in connection with the lowermost box. These mercury-sinks form constituents of the amalgamating vibrating plates, and the latter terminate in or over the fixed troughs.

A convenient size for the screens will be thirty inches wide by six feet long, and each screen will have a longitudinal central support, either on its upper or under side. The throw or extent of movement of the box is from an eighth to a quarter of an inch, and the movement is rapid to insure the most thorough agitation and uniform thin flow of the pulp over the screens and the amalgamating-plates. Such reciprocating movements of the boxes are shown as being effected by eccentrics s on shafts t, driven by a belt, u; or any other suitable means may be employed for the purpose.

The mercury-sink stirrers are operated by belts from the shafts t, or pulley-connections with a counter-shaft, as may be found most convenient. Since the throw of the box is so slight, these stirrers can be operated by such connections by having a certain slack in the cords or belts.

Two or more vibrating sizing and amalgamating sluice-boxes may be used in the relation described; but when more than two are used the intermediate one or ones must, like the top box, deliver the pulp from the amalgamating-plate upon the upper end of a sizing-screen in the box next below.

To adapt the screen and the amalgamated plate for removal and replacement, the sides of the box are provided with grooves to receive them, and a cross-bolt, v, serves to clamp the box upon these parts to hold them in position. The weight and force of the dropping or falling of the ore pulp in a divided state upon the amalgamated plates serves to aid in fixing the metallic particles to these plates. The plates should have considerable incline to keep them continually clean, so that the divided falling particles may strike directly upon the amalgamated surface. The screen should not be too far from the plates, because the particles would strike with too much force, and thereby wear out the plates; but a slight concussion is beneficial in promoting amalgamation. The amalgamated plate in some cases should have a greater incline than the screen; but its surface must always be bared to the screen.

I claim—

1. In an amalgamator, the sluice-box c, having the inclined screen b, and the inclined bottom amalgamating-plate, e, adapted to have short quick vertical and vibratory movements, in combination with one or more separate independent bottom sluice-boxes having oppositely-inclined top screens, i, of finer mesh, and inclined bottom amalgamating-plates, the separate sluice-boxes having independent endwise and vertical short quick vibratory movements, the upper ones delivering upon the lower one, substantially as shown, for the purpose specified.

2. In an amalgamator, the sluice-box having an inclined screen, an inclined amalgamated plate, and the supplemental end sluice-box having a coarser screen, and an amalgamated plate arranged upon and forming part of the sluice-box, and adapted together to have short quick vertical and vibratory movements, substantially as described.

3. The herein-described amalgamator, consisting of the oppositely-arranged sluice-boxes, each having a top inclined screen of different mesh, an inclined amalgamated plate, an end sluice-box, h, having a screen, f, of larger mesh than the screens b i, and having an amalgamated plate, g, a mercury-sink, l, and a stirrer, m, the lower sluice-box having also a mercury-sink, l, and a stirrer, m, the said oppositely-arranged sluice-boxes being given independent shaking vertical and horizontal motions, substantially as and for the purpose herein set forth.

4. The combination, in an amalgamator, of the sluice-boxes arranged in opposite varied inclinations, each having a top screen of different-sized mesh, and an amalgamated plate for each screen of separate size of mesh, with the inclined elastic supports for said sluice-boxes, and the eccentric connections, substantially as shown, and for the purpose specified.

In testimony whereof I have hereunto set my hand in the presence of two subscribing witnesses.

CHAS. D. BIGELOW.

Witnesses:
A. E. H. JOHNSON,
EDMOND BRODHAG.